Jan. 6, 1959   R. J. WAGNER   2,867,757
ELECTRICAL APPARATUS
Filed Sept. 25, 1953   2 Sheets-Sheet 1

INVENTOR.
ROBERT J. WAGNER
BY Arthur H. Swanson
ATTORNEY.

Jan. 6, 1959 R. J. WAGNER 2,867,757
ELECTRICAL APPARATUS
Filed Sept. 25, 1953 2 Sheets-Sheet 2
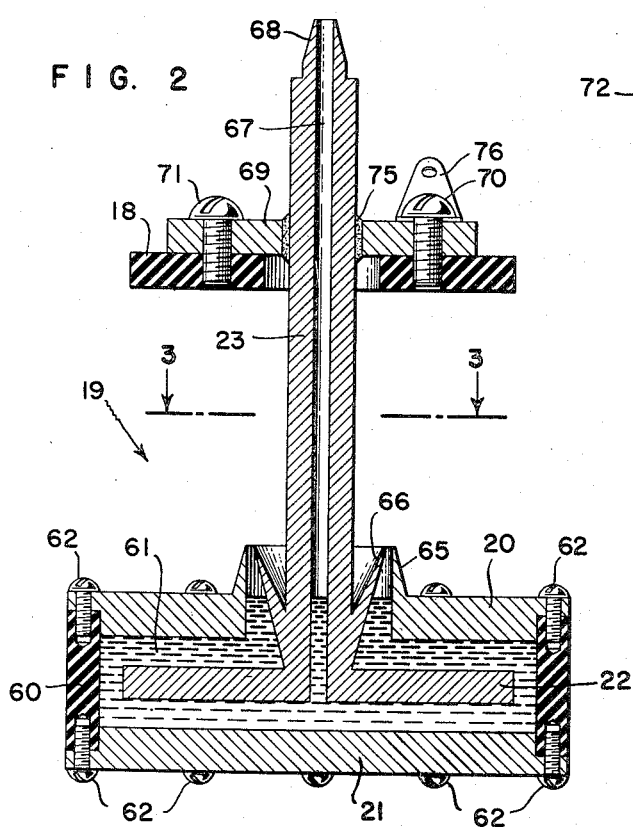
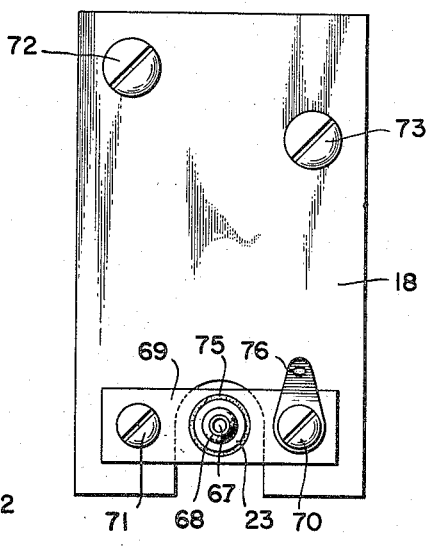
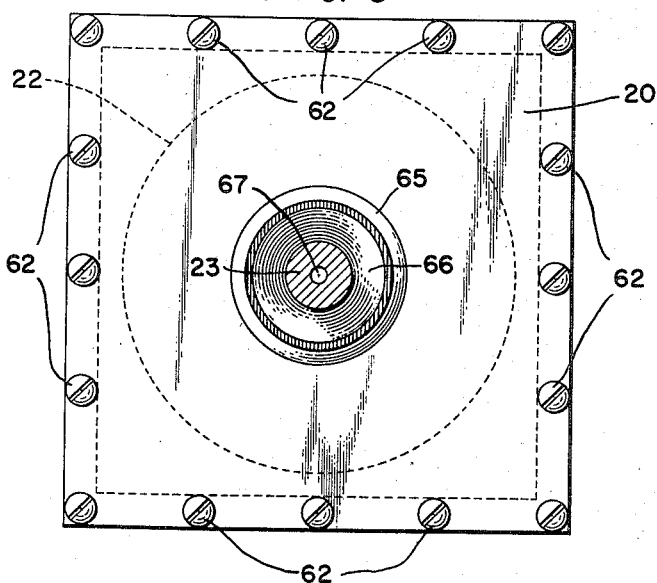
INVENTOR.
ROBERT J. WAGNER
BY Arthur H. Swanson
ATTORNEY.

United States Patent Office 2,867,757
Patented Jan. 6, 1959

2,867,757

ELECTRICAL APPARATUS

Robert J. Wagner, Feasterville, Pa., assignor to Minneapolis-Honeywell Regulator Company, Minneapolis, Minn., a corporation of Delaware Application September 25, 1953, Serial No. 382,393

1 Claim. (Cl. 317—246)

The general object of the present invention is to provide a new and improved adjustable impedance element. More particularly, the present invention is concerned with an improved adjustable impedance element which is characterized by its having a minimum of internal frictional loss with the components of the element being surrounded by a liquid which enhances the electrical characteristics of the element, and wherein the element is arranged so that the liquid surrounding the components for the element will not escape from an enclosed area even though there is no direct mechanical sealing means provided for keeping the liquid within the enclosure.

In certain types of variable measuring apparatus, it is desirable to have a highly sensitive motion detector which may be used to convert a mechanical signal into a proportional electrical signal. It has heretofore been proposed to use a pair of relatively adjustable condenser plates as a motion detector. In some instances, some type of oil has been placed between the condenser plates in order to enhance the output electrical change for a certain input motion. When oil has been used, the condenser plates are generally placed in a sealed container so that oil will not escape from the unit. When a motion is to be fed into such a device, the motion must be transmitted through a mechanical seal which seal will introduce frictional and loading losses on the device producing the input motion. In controls where high accuracy is important, such frictional losses and loading cannot be tolerated. If the mechanical seal is eliminated in the conventional manner, the oil in the enclosure will be free to escape by migration, capillary action, and spilling which will result in the destruction of the electrical characteristics of the detector as well as produce an undesirable oily condition in the vicinity of the detector.

It is therefore a more specific object of the present invention to overcome the foregoing difficulties of the prior art devices and provide an impedance type of motion detector which contains a liquid with the liquid being retained within the unit even though no mechanical seal is provided.

A further more specific object of the present invention is to provide a new and improved motion detector which comprises an impedance element having a pair of relatively movable parts which are immersed in a liquid with the liquid being retained within the enclosure by knife edges whose surfaces act to prevent the migration of liquid from the device.

A still further object of the present invention is to provide a new and improved impedance type sensing element which employs a pair of relatively movable elements immersed in a liquid with the liquid being contained within an enclosure having a mechanical input motion connection wherein there are knife edges around the opening of the enclosure and a knife edge carried by the input motion connection.

Another more specific object of the present invention is to provide an improved adjustable impedance sensing element of the oil filled type wherein oil is injected into the system by a hole extending through the input connection to the device.

Still another more specific object of the present invention is to provide a liquid seal for a liquid filled chamber where the seal comprises a pair of knife edges mechanically separated and spaced so as to prevent the liquid from leaving the chamber.

The various features of novelty which characterize the invention are pointed out with particularity in the claim annexed to and forming a part of the specification. For a better understanding of the invention, its advantages, and specific objects attained with its use, reference should be had to the accompanying drawings and descriptive matter in which there is illustrated and described a preferred embodiment of the invention.

Of the drawings:

Fig. 2 is a cross sectional view of the impedance sensing element of the apparatus;

Fig. 3 is a plan view of Fig. 2 taken along the section line 3—3; and

Fig. 4 is a top view of the plate which carries the sensing element of the present invention.

Figure 1:
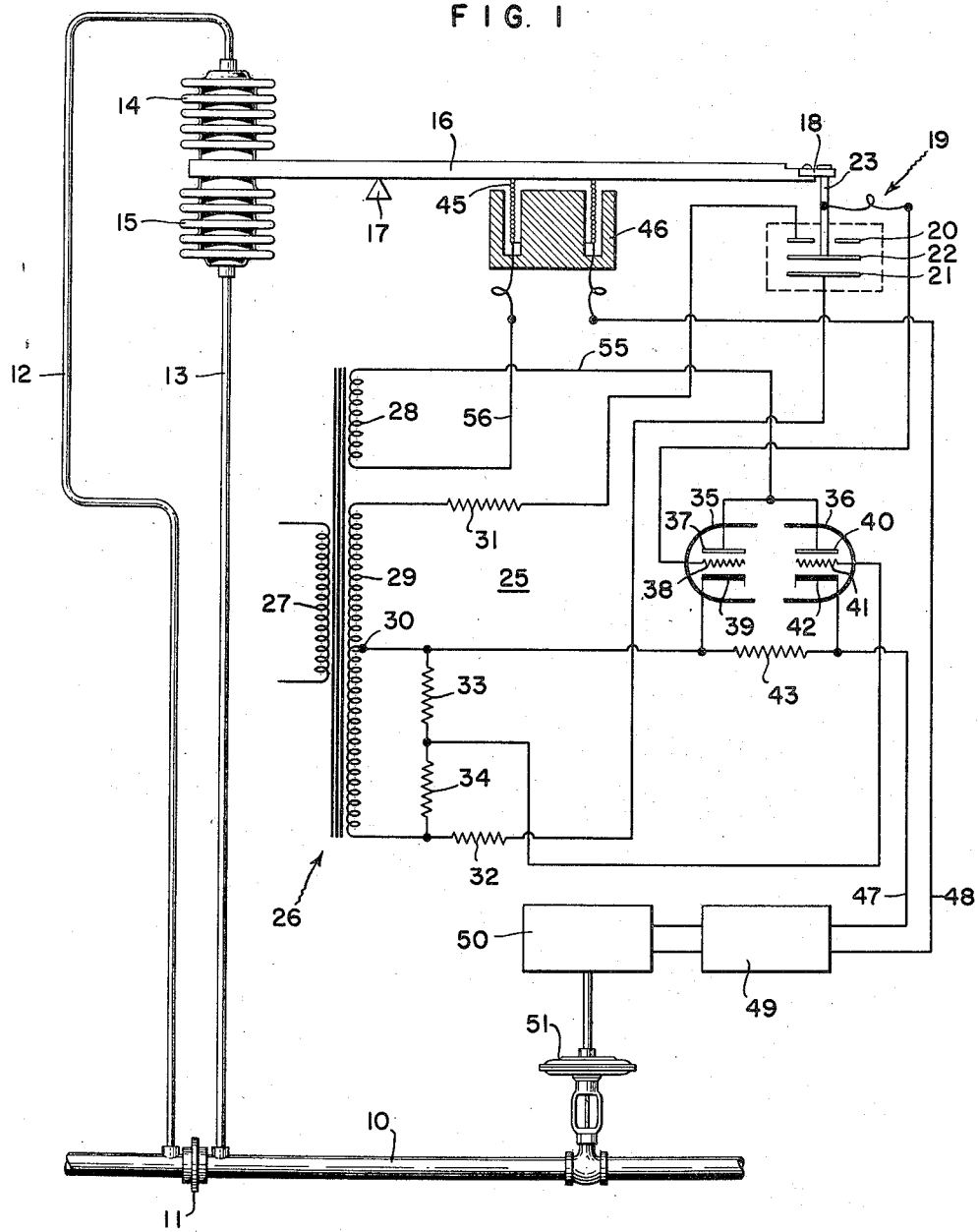
Fig. 1 is a schematic showing of a variable sensing apparatus of the type which may incorporate the present invention.

Referring first to Fig. 1 there is shown a representative apparatus for determining a magnitude of a variable which is, in the figure, the flow of a fluid through a conduit 10. The conduit 10 has an orifice plate 11 of conventional type located therein and a pair of pressure takeoffs 12 and 13. The output pressures from these two takeoffs are applied to a pair of bellows 14 and 15 respectively. The bellows 14 and 15 are fixed at their outer ends and fastened to a movable beam 16 which is pivoted at 17. The movement of the beam 16, or the forces applied thereto by the differential pressures from the bellows 14 and 15 will be proportional to the flow of fluid through the pipe 10. Carried on the right end of the beam 16 is a fastening plate 18 for a motion detector 19. The motion detector 19 includes a pair of fixed condenser plates 20 and 21 and a movable condenser plate 22, the latter of which is connected to the motion detector connector 18 by a rod or shaft 23. This motion detector is shown in expanded detail in Fig. 2 and Fig. 3.

The output of the motion sensing element is applied to an electronic circuit 25. This circuit comprises an input transformer 26 having a primary winding 27, secondary winding 28, and a secondary 29, the latter of which is tapped at 30. Connected to the ends of the secondary winding 29 are a pair of resistors 31 and 32. Connected between the tap 30 and the lower end of the secondary 29 are a pair of resistors 33 and 34.

The secondary winding 28 is used to supply power to a pair of electronic amplifying devices 35 and 36. The device 35 comprises an anode 37, control electrode 38, and a cathode 39 while the device 36 comprises an anode 40, control electrode 41, and a cathode 42. Connected between the cathodes 39 and 42 is a resistor 43.

Connected to the beam 16 and connected in the output circuit of the electronic circuit 25 is a coil 45 which cooperates with a magnet 46 creating a force balancing action for the beam 16. The output current for the apparatus is arranged to flow through leads 47 and 48 to a suitable electrical controller 49. This controller may be of the type shown in the copending application of William F. Newbold, entitled Electrical Control Apparatus, bearing Serial No. 366,037, filed July 3, 1953. Controller 49 may be arranged to produce appropriate proportional action as well as reset action and supply an output current which is applied to an electro-pneumatic valve positioner 50. This valve positioner may take the form of the apparatus disclosed in the copending application of William J. Popowsky, entitled Control Apparatus, bearing Serial No. 365,757, and filed July 2, 1953. The output of the valve positioner 50 is a pneumatic pressure which is arranged to control the operation of a pneumatic valve 51, the latter of which may be used to control the flow of the fluid in the conduit 10.

In considering the operation of the apparatus of Fig. 1, it is assumed that the apparatus is in the condition shown upon the drawing and is in a balanced state with the condenser plate 22 centered between the fixed plates 20 and 21 and with the output current through the coil 45 being sufficient to balance the input forces originating from the bellows 14 and 15. When in a balanced state, the electrical potential of the movable electrode 22 will be effectively centered at the center voltage of the secondary 29 due to the fact that the fixed plates 20 and 21 are connected to the upper and lower ends respectively of the secondary 29. Since the cathode 39 of the device 35 is connected directly to the tap 30 the control electrode 38 is effectively connected to the same point so that the device 35 will be acting as a diode. The conduction of the device 35 will occur during the particular half cycle in which the secondary winding 28 is phased so that the upper terminal of the secondary winding is positive with respect to the lower terminal. The current flow for the device 35 may be traced from the upper terminal of the secondary 28 through lead 55, anode 37, cathode 39, resistor 43, lead 47, controller 49, lead 48, coil 45 and lead 56 back to the lower terminal of the secondary 28.

The conduction of the device 36 is dependent upon the electrical potential of the control electrode 41. The control electrode potential is determined in part by the connection of the control electrode 41 to the voltage dividers 33 and 34 as well as the voltage drop existing across the resistor 43 which is connected to the cathode 42. When the device 35 is conducting, the voltage drop across the resistor 43 is in a direction to cause the device 36 to conduct more. This current flow adds to the current flow originating through the device 35.

If the secondary windings 28 and 29 are phased in a like manner so that both their upper terminals are positive at the same time, the upward movement of the rod 23 of the motion detector 19 will cause the plate 22 to move closer to the plate 20 and thus the electrical potential of the element 22 will approach the potential of the upper end of the secondary 29. This will cause the control electrode 38 to be biased in a positive direction which will tend to cause device 35 to conduct a greater amount. The greater conduction of the device 35 will result in a higher conduction by the device 36. The larger current flow through the devices 36 and 35 which passes through the force balancing coil 45 will produce a force on the beam 16 tending to pull the beam back toward its neutral or balanced position.

Should the motion applied to the detector 19 be the opposite to that just described, the current flow through the devices 35 and 36 will decrease. This will mean a lower force balancing current through the coil 45.

The current flow conditions in the conductors 47 and 48 are effective on the input of the controller 49 to produce an output controlling action on the valve positioner 50. The valve positioner will in turn establish a predetermined position for the valve 51 so as to maintain the flow of the fluid through the conduit 10 at a desired value.

In Fig. 2 the motion detector 19 is shown in enlarged detail. It will be seen that the condenser plate 20 and the plate 21 are separated by a separating element 60 which is of the liquid impervious electrical insulating type. When the plates 20 and 21 are fastened tightly to the separating element 60 there is formed a liquid tight chamber which is arranged to be filled with liquid 61. When the apparatus is used with a condenser, a suitable oil is preferred as the filling liquid. One liquid found satisfactory was a silicone oil having a viscosity of approximately one thousand centistokes. The plates 20 and 21 are rigidly fastened to the separating element 60 by a plurality of screws 62 which extend around the periphery of the plates. Inasmuch as the plate 22 is arranged to be adjusted in its position between the fixed plates 20 and 21, it is essential that some input motion connection be provided. The input motion connecting element 23 provides this connection and it extends through a hole in the plate 20. The edges of the hole in the plate 20 have an upwardly extending knifelike shoulder 65 with the upper edge thereof being relatively sharp. The knifelike edge on the upwardly extending shoulder 65 has the effect of breaking any oil film which tends to migrate up the sides of the opening and would normally flow to the outer surface of the plate 20 in the absence of this knifelike edge.

Fastened to the input motion connecting element 23 is an outwardly extending conical shoulder 66 which likewise has a knife edge at the outer end thereof. This knife edge likewise has the effect of preventing any oil migration along the surface of the motion connecting element 23.

The knife edges of the shoulders 65 and 66 are positioned so as to be in cooperative relationship with a very small distance between the two. The spacing between these two knife edges is such that for the particular type of liquid used the surface tension of the oil will not be broken if the unit is turned in a position so that the knife edges are extending downwardly. In other words, there is a certain critical distance for each particular liquid which might be used in the apparatus where the surface tension would be broken if the apparatus were placed in an inverted position. By keeping this distance relatively small, this difficulty does not occur. For the particular oil used in one embodiment of the invention, the selected spacing was approximately 0.018 inch.

As there is a liquid within the device, it is necessary to provide some means for getting the liquid in. A preferred arrangement is to place a hole as at 67 through the motion connecting member 23. A suitable connection at 68 provides a means for connecting a suitable filling member thereto such as a bulb syringe type of apparatus. The upper end of the motion connecting member 23 around the edges of the hole 67 also has a knife edge therearound which performs the same function as the knife edges associated with the shoulders 65 and 66. Whether or not such is needed depends upon the length of the motion connecting member 23.

When the unit is filled, it is preferable that sufficient oil be placed within the chamber so that the oil rises above the lower surface of the plate 20 and up into the area between the shoulders 65 and 66 although not clear to the top. Block 69 provides a means for fastening the motion connecting element 23 to some other suitable means, such as the connecting element 18, shown in Fig. 1. The block 69 is fastened to the element 18 by a pair of screws 70 and 71 in the manner shown in Fig. 4 where the plate 18 is in plan view. The plate 18 is in turn fastened by means of screws 72 and 73 to the beam 16.

The alignment of the plate 22 with respect to the plates 20 and 21 is extremely critical and it has been found that the most expeditious manner of alignment involves depressing the plate 22 against the plate 21 with the knife edges of the shoulders 65 and 66 being in alignment and squarely spaced around the periphery of the opening. With the plate 22 rigidly held in position, the fastening plate 69 is soldered into position at 75. The plate 22 may then be raised away from the plate 21 and the apparatus will be in proper alignment.

Electrical connection may be made to the center plate by means of a connector 76 which is fastened under the screw 70 while connections may be made to the plates 20 and 21 by connectors, not shown, fastened under the screws 62 which are used to hold the plates in position.

While the apparatus has been explained in terms of an electrical condenser, it will be obvious that the principles involved are applicable to any type of motion detector wherein it is desired to have a liquid within an enclosure where a motion must be transmitted into the enclosure with a minimum of loading and friction. While a slight damping action may take place due to the liquid 61 flowing around the edges of the plate 22 as the plate is moved back and forth between the plates 20 and 21, this damping is generally not undesirable and the effectiveness of the damping will be dependent in part upon the cross sectional internal area of the separator element 60 with respect to the cross sectional area of the movable plate 22.

While, in accordance with the provisions of the statutes, there have been illustrated and described the best forms of the invention known, it will be apparent to those skilled in the art that changes may be made in the forms of the apparatus disclosed without departing from the spirit of the invention as set forth in the appended claims and that in some cases certain features of the invention may be used to advantage without a corresponding use of other features.

Having now described my invention, what I claim as new and desire to secure by Letters Patent is:

An adjustable impedance element comprising, a first metallic plate, a second metallic plate, a hollow separating member formed of electrical insulating material separating said metallic plates in fixed relation and forming with said plates an enclosure, means defining an opening through one of said plates and having an outwardly extending knife edge surrounding said opening, a movable metallic plate positioned between said first and second plates, a mechanical input member connected to said movable plate and extending through said opening, said input member having an outwardly extending conical surface with a knife edge which is arranged to be in cooperative relation with the knife edge of said opening, and a liquid filling said enclosure to an extent to cover the cooperating surfaces of said plates with said cooperating knife edges serving to retain said liquid within said enclosure.

References Cited in the file of this patent

UNITED STATES PATENTS

| | | |
|---|---|---|
| 464,667 | Tesla | Dec. 8, 1891 |
| 2,319,940 | Marrison | May 25, 1943 |
| 2,365,487 | Murray | Dec. 19, 1944 |
| 2,408,392 | Gillum | Oct. 1, 1946 |
| 2,464,716 | Piton | Mar. 15, 1949 |
| 2,519,689 | Morrow | Aug. 22, 1950 |
| 2,569,311 | Hoare | Sept. 25, 1951 |